United States Patent
Kumar et al.

(10) Patent No.: US 7,320,035 B2
(45) Date of Patent: Jan. 15, 2008

(54) OBJECT MUTATION DETERMINATION FOR INCREMENTAL STATE SAVES

(75) Inventors: Ajay Kumar, Bangalore (IN); Hanumantha Rao Susarla, Bangalore (IN); Prakash Khemani, Bangalore (IN)

(73) Assignee: Sun Microsystems, Inc., Santa Clara, CA (US)

(*) Notice: Subject to any disclaimer, the term of this patent is extended or adjusted under 35 U.S.C. 154(b) by 971 days.

(21) Appl. No.: 10/087,225

(22) Filed: Mar. 1, 2002

(65) Prior Publication Data
US 2003/0167332 A1 Sep. 4, 2003

(51) Int. Cl.
G06F 15/16 (2006.01)

(52) U.S. Cl. ..................... 709/227; 709/223

(58) Field of Classification Search ........ 710/200–244; 345/533–534, 179; 365/189.01, 189.08, 365/230.01, 189.05; 718/100–108; 709/227, 709/204–205, 203, 1, 218, 220, 206, 248, 709/250, 231, 223; 707/8, 201, 203, 205, 707/10, 103, 3; 711/141–153; 717/122; 713/400, 153; 719/310; 340/573
See application file for complete search history.

(56) References Cited

U.S. PATENT DOCUMENTS

| | | | |
|---|---|---|---|
| 5,454,108 A | 9/1995 | Devarakonda et al. | |
| 5,634,122 A | 5/1997 | Loucks et al. | |
| 5,666,486 A | 9/1997 | Alfieri et al. | |
| 5,684,807 A | 11/1997 | Bianchini et al. | |
| 5,721,943 A | 2/1998 | Johnson | |
| 5,734,909 A | 3/1998 | Bennett | |
| 5,754,703 A * | 5/1998 | Kim | 382/241 |
| 5,790,425 A * | 8/1998 | Wagle | 709/218 |
| 5,812,780 A | 9/1998 | Chen et al. | |
| 5,813,017 A | 9/1998 | Morris | |
| 5,852,747 A | 12/1998 | Bennett et al. | |
| 5,864,539 A * | 1/1999 | Yin | 370/236 |
| 5,870,759 A | 2/1999 | Bauer | |
| 5,884,325 A * | 3/1999 | Bauer et al. | 707/201 |

(Continued)

OTHER PUBLICATIONS

Burns, R.C.; A Linear Time, Constant Space Differencing Algorithm; Feb. 1997; Dept. of Computer Engineering, California University; p. 429.*

(Continued)

Primary Examiner—Thong Vu
(74) Attorney, Agent, or Firm—Robert C. Kowert; Meyertons, Hood, Kivlin, Kowert & Goetzel, P.C.

(57) ABSTRACT

A client-server system may include a distributed store configured to maintain a primary state of session data. The system may also include one or more application servers that each may include a client state of the session data. The session data may include one or more attributes. In one embodiment, the client state may be accessible by clients of the system. The application server may compare the client state to a benchmark of the client state to determine a subset of the attributes that have been modified in the client state. In some embodiments, the comparison may be a binary differencing or object graph differencing of the client state and the benchmark of the client state to locate the modified attributes. The distributed store may synchronize the primary state with the client state using the subset of the attributes.

42 Claims, 11 Drawing Sheets

U.S. PATENT DOCUMENTS

| | | | |
|---|---|---|---|
| 5,907,848 A | 5/1999 | Zaiken et al. | |
| 5,913,213 A | 6/1999 | Wikstrom et al. | |
| 5,951,694 A | 9/1999 | Choquier et al. | |
| 6,002,868 A | 12/1999 | Jenkins et al. | |
| 6,006,259 A | 12/1999 | Adelman et al. | |
| 6,032,216 A | 2/2000 | Schmuck et al. | |
| 6,067,559 A | 5/2000 | Allard et al. | |
| 6,097,380 A | 8/2000 | Crites et al. | |
| 6,108,699 A | 8/2000 | Moiin | |
| 6,131,166 A | 10/2000 | Wong-Insley | |
| 6,167,490 A | 12/2000 | Levy et al. | |
| 6,175,931 B1 | 1/2001 | Hornung | |
| 6,182,152 B1* | 1/2001 | Jonkers | 719/310 |
| 6,192,370 B1* | 2/2001 | Primsch | 707/103 R |
| 6,192,401 B1 | 2/2001 | Modiri et al. | |
| 6,195,091 B1 | 2/2001 | Harple et al. | |
| 6,249,879 B1 | 6/2001 | Walker et al. | |
| 6,324,492 B1 | 11/2001 | Rowe | |
| 6,330,689 B1 | 12/2001 | Jin et al. | |
| 6,360,249 B1 | 3/2002 | Courts et al. | |
| 6,360,271 B1* | 3/2002 | Schuster et al. | 709/231 |
| 6,430,335 B1 | 8/2002 | Carberry et al. | |
| 6,438,560 B1* | 8/2002 | Loen | 707/103 R |
| 6,477,172 B1 | 11/2002 | Burger et al. | |
| 6,480,473 B1 | 11/2002 | Chambers et al. | |
| 6,484,185 B1 | 11/2002 | Jain et al. | |
| 6,499,031 B1 | 12/2002 | Hopmann et al. | |
| 6,512,740 B1 | 1/2003 | Baniewicz et al. | |
| 6,522,995 B1 | 2/2003 | Conti et al. | |
| 6,529,941 B2 | 3/2003 | Haley et al. | |
| 6,532,494 B1 | 3/2003 | Frank et al. | |
| 6,539,381 B1* | 3/2003 | Prasad et al. | 707/10 |
| 6,546,135 B1 | 4/2003 | Lin et al. | |
| 6,567,808 B1 | 5/2003 | Eschelbeck et al. | |
| 6,567,846 B1* | 5/2003 | Garg et al. | 709/218 |
| 6,574,197 B1 | 6/2003 | Kanamaru et al. | |
| 6,591,295 B1 | 7/2003 | Diamond et al. | |
| 6,594,686 B1 | 7/2003 | Edwards et al. | |
| 6,618,737 B2* | 9/2003 | Aridor et al. | 707/205 |
| 6,636,897 B1* | 10/2003 | Sherman et al. | 709/248 |
| 6,643,652 B2 | 11/2003 | Helgeson et al. | |
| 6,664,897 B2* | 12/2003 | Pape et al. | 340/573.3 |
| 6,684,207 B1* | 1/2004 | Greenfield et al. | 707/3 |
| 6,687,735 B1* | 2/2004 | Logston et al. | 709/203 |
| 6,687,745 B1 | 2/2004 | Franco et al. | |
| 6,704,782 B1 | 3/2004 | Achtermann et al. | |
| 6,718,394 B2 | 4/2004 | Cain et al. | |
| 6,724,374 B1* | 4/2004 | Lapstun et al. | 345/179 |
| 6,738,975 B1 | 5/2004 | Yee et al. | |
| 6,742,141 B1 | 5/2004 | Miller | |
| 6,748,429 B1 | 6/2004 | Talluri et al. | |
| 6,748,554 B2 | 6/2004 | Jin et al. | |
| 6,760,765 B1 | 7/2004 | Asai et al. | |
| 6,799,191 B2* | 9/2004 | Agesen et al. | 707/206 |
| 6,801,937 B1 | 10/2004 | Novaes et al. | |
| 6,813,635 B1 | 11/2004 | Jorgenson | |
| 6,816,905 B1 | 11/2004 | Sheets et al. | |
| 6,820,210 B1 | 11/2004 | Daruwalla et al. | |
| 6,847,993 B1 | 1/2005 | Novaes et al. | |
| 6,859,834 B1 | 2/2005 | Arora et al. | |
| 6,877,111 B2 | 4/2005 | Sharma et al. | |
| 6,889,333 B2* | 5/2005 | Lawrence et al. | 713/400 |
| 6,895,401 B2 | 5/2005 | Skinner et al. | |
| 6,920,474 B2 | 7/2005 | Walsh et al. | |
| 6,928,378 B2 | 8/2005 | Lebee et al. | |
| 6,944,788 B2 | 9/2005 | Dinker et al. | |
| 6,961,769 B2 | 11/2005 | Arora et al. | |
| 7,093,230 B2 | 8/2006 | E et al. | |
| 7,130,905 B2 | 10/2006 | Dinker et al. | |
| 2001/0010053 A1 | 7/2001 | Ben-Schacher et al. | |
| 2001/0014097 A1 | 8/2001 | Beck et al. | |
| 2001/0027453 A1 | 10/2001 | Suto | |
| 2001/0040895 A1 | 11/2001 | Templin | |
| 2002/0038301 A1* | 3/2002 | Aridor et al. | 707/10 |
| 2002/0038451 A1* | 3/2002 | Tanner et al. | 717/105 |
| 2002/0042693 A1 | 4/2002 | Kamp et al. | |
| 2002/0062372 A1 | 5/2002 | Hong et al. | |
| 2002/0069270 A1* | 6/2002 | Walton et al. | 709/220 |
| 2002/0073080 A1 | 6/2002 | Lipkin | |
| 2002/0091750 A1 | 7/2002 | Kasaravalli et al. | |
| 2002/0112008 A1* | 8/2002 | Christenson et al. | 709/206 |
| 2002/0143958 A1 | 10/2002 | Montero et al. | |
| 2002/0152307 A1 | 10/2002 | Doyle et al. | |
| 2002/0165961 A1 | 11/2002 | Everdell et al. | |
| 2003/0005020 A1* | 1/2003 | Wallman et al. | 709/1 |
| 2003/0014513 A1* | 1/2003 | Ruths et al. | 709/223 |
| 2003/0014650 A1 | 1/2003 | Freed et al. | |
| 2003/0018785 A1 | 1/2003 | Eshel et al. | |
| 2003/0041179 A1 | 2/2003 | Snead et al. | |
| 2003/0051145 A1 | 3/2003 | Jackson et al. | |
| 2003/0061065 A1* | 3/2003 | Keeley | 705/1 |
| 2003/0069874 A1* | 4/2003 | Hertzog et al. | 707/1 |
| 2003/0074395 A1 | 4/2003 | Eshghi et al. | |
| 2003/0088659 A1 | 5/2003 | Susarla et al. | |
| 2003/0101300 A1 | 5/2003 | Goldick | |
| 2003/0110445 A1 | 6/2003 | Khaleque | |
| 2003/0140223 A1* | 7/2003 | Desideri | 713/153 |
| 2003/0154202 A1 | 8/2003 | Dinker et al. | |
| 2003/0163494 A1 | 8/2003 | Bender et al. | |
| 2003/0167268 A1 | 9/2003 | Kumar et al. | |
| 2003/0167285 A1 | 9/2003 | Kumar et al. | |
| 2003/0167297 A1 | 9/2003 | Kumar et al. | |
| 2003/0167331 A1 | 9/2003 | Kumar et al. | |
| 2003/0167333 A1 | 9/2003 | Kumar et al. | |
| 2003/0204509 A1 | 10/2003 | Dinker et al. | |
| 2003/0204623 A1 | 10/2003 | Caln | |
| 2003/0204786 A1 | 10/2003 | Dinker et al. | |
| 2003/0212987 A1 | 11/2003 | Demuth et al. | |
| 2003/0233250 A1* | 12/2003 | Joffe et al. | 705/2 |
| 2004/0044672 A1 | 3/2004 | Spencer | |
| 2004/0059805 A1 | 3/2004 | Dinker et al. | |
| 2004/0066741 A1 | 4/2004 | Dinker et al. | |
| 2004/0098490 A1 | 5/2004 | Dinker et al. | |
| 2004/0103098 A1 | 5/2004 | Mitra | |
| 2004/0111536 A1* | 6/2004 | Ellerbrock et al. | 709/250 |
| 2004/0162642 A1* | 8/2004 | Gasper | 700/286 |
| 2004/0162885 A1 | 8/2004 | Garg et al. | |
| 2004/0199815 A1 | 10/2004 | Dinker et al. | |
| 2005/0086239 A1* | 4/2005 | Swann et al. | 707/100 |

OTHER PUBLICATIONS

Development of artificial life based optimization system Inoue, H.; Funyu, Y.; Kishino, K.; Jinguji, T.; Shiozawa, M.; Yoshikawa, S.; Nakao, T.; Parallel and Distributed Systems, 2001. ICPADS 2001. Proceedings. Eighth International Conference on Jun. 26-29, 2001 pp. 429-436.*

Evolutionary programming made faster; Xin Yao; Yong Liu; Guangming Lin; Evolutionary Computation, IEEE Transactions on vol. 3, Issue 2, Jul. 1999 pp. 82-102.*

Generating test cases for XML-based Web component interactions using mutation analysis Suet Chun Lee; Offutt, J.; Software Reliability Engineering, 2001. ISSRE 2001. Proceedings. 12th International Symposium on Nov. 27-30, 2001, pp. 200-209.*

A genetic algorithm based approach for multi-objective data-flow graph optimization Landwehr, B.; Design Automation Conference, 1999. Proceedings of the ASP-DAC '99. Asia and South Pacific Jan. 18-21, 1999 pp. 355-358 vol. 1.*

"iPlanet Application Server—Overview Guide—Version 6.0," Sun Microsystems, Inc., May 2000, (78 Pages).

Burns et al., "A Linear Time, Constant Space Differencing Algorithm," 1997 IEEE, Performance, Computing and Communications Conference, 1997, (pp. 429-436).

Roh, et al., "A Switchable Session Managemetn for the Distributed Multimedia-on-Demand System, Protocols for Multimedia Systems—Multimedia Networking," 1997, Proceedings IEEE Conference on Nov. 24-27, 1997, pp. 102-111.

Devarakonda, Murthy, et al., "Recovery in the Calypso Filesystem" ACM Transactions on Computer Systems, vol. 14, No. 3, Aug. 1996, pp. 287-310.

* cited by examiner

OBJECT MUTATION DETERMINATION FOR INCREMENTAL STATE SAVES

BACKGROUND OF THE INVENTION

1. Field of the Invention

This invention relates to providing quality of service in a networked environment, and more particularly to determining mutated objects and improving the efficiency of state saves in a distributed data systems.

2. Description of the Related Art

In the client server environment, a session may include a series of user-application interactions that may be tracked by one or more servers. Sessions may be used for maintaining user-specific states, and may include persistent objects (e.g. handles to Enterprise Java Beans and/or database record sets) and authenticated user identities, among other interactions. For example, a session may be used to track a validated user login followed by a series of directed activities for that particular user. The session may reside in a server. For each request, a client may transmit a session ID in a cookie or, if the client does not allow cookies, the server may automatically write a session ID into a URL. The session ID may be used as a database key to access persistent objects associated with the client. Types of sessions may include, but are not limited to, distributed sessions and local sessions. Distributed sessions may be distributed among multiple servers, for example in a cluster, whereas local sessions may be bound to an individual server.

Distributed sessions may facilitate scalability, fail-safe techniques, and security. For example, a web server may distribute activity to remain scalable with respect to network traffic. Thus, a complete description (referred to as "session data") of a distributed session may include state information for each process and/or computing system over which the session is distributed. For example, session data may include a snapshot of a session between a web browser and a web server may include one or more of the state of the web browser process(es), the state of the computing system hosting the web browser, the state of the web server process (es), the state of the computing system hosting the web server, the state of the computing system hosting an application server providing content to the web server, the sate of the application server process(es), and the state of one or more applications, processes and/or threads hosted by the application server or optionally on any other system involved in the distributed session.

For a distributed session, a primary state and one or more client states may be maintained. The primary state may be defined as a global instance of session data accessible by one or more application servers. A client state may be defined as a local instance of session data on an application server. The client state may include session data from internal or external client interaction with the application server. For example, the client may include, but is not limited to, a process, a thread within a process, or an application running on one or more external or internal devices and/or computing systems. The client states may serve as interfaces between clients, application servers, and the primary state, and may provide read and/or write access to the primary state to the application servers.

Client-server applications may store distributed session information as snapshots of the states of participating processes, resources, and computing systems to minimize data loss in case of failure. Current techniques for storing state information from distributed sessions may result in inconsistent primary state data and consume significant amounts of resources.

Client state information may be retrieved and written by multiple servers at the same time resulting in data loss. For example, an application on one server may access session data in a primary state, while another application on another server accesses the same session data. Then, the first application may update the session data. The second application may update the session data after the first application. Portions of the session data updated by the first application may be overwritten, resulting in loss of data. This data loss may be referred to as "data clobbering."

State information involving multiple applications and servers across a network may consume significant network resources. To update and/or backup state information, a large amount of data may be sent to one or more network storage mediums thereby consuming network bandwidth and other resources. Restoring state information from one or more network storage mediums may consume bandwidth and other resources as well. Bandwidth and resource intensive state save operations may result in delays in servicing requests. Such delays may adversely affect the quality of service of the application.

SUMMARY OF THE INVENTION

A client-server system may include a distributed store configured to maintain a primary state of session data. The system may also include one or more application servers that each may include a client state of the session data. The session data may include one or more attributes. In one embodiment, the client state may be accessible by clients of the system.

The application server may compare the client state to a benchmark of the client state to determine a subset of the attributes that have been modified in the client state. In one embodiment, the comparison may be a binary differencing of a binary representation of the client state and a binary representation of the benchmark of the client state to locate the modified attributes. In another embodiment, the comparison may be an object graph differencing of an object graph representation of the client state and an object graph representation of the benchmark of the client state to locate the modified attributes. The distributed store may synchronize the primary state with the client state using the subset of the attributes.

In some embodiments, the application server may track accesses of the attributes of the client state. In one embodiment, the application server may track only mutable attributes. In one embodiment, the application server may track only mutable accesses of the attributes of the client state. Mutable accesses may include write accesses of any of the attributes of the client state and read accesses of mutable attributes of the client state.

In some embodiments, the application server may compare (e.g. by binary differencing or object graph differencing) the tracked accessed attributes to a benchmark of the attributes of the client state to determine a subset of the tracked accessed attributes that may have been modified in the client state. The distributed store may synchronize the primary state with the client state using the subset of the tracked accessed attributes.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Figure 1:
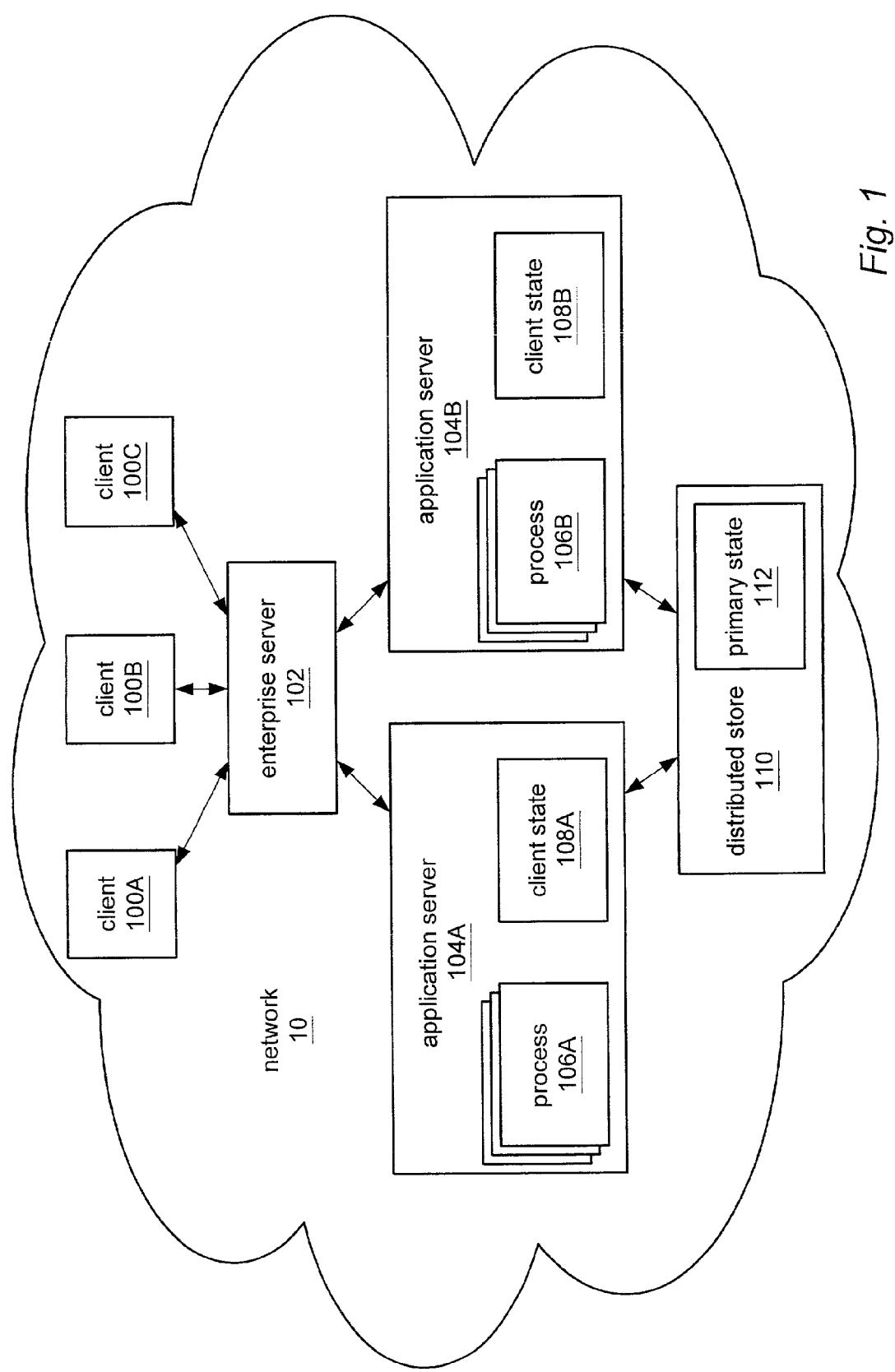
FIG. 1 illustrates an exemplary enterprise information system (EIS) with distributed session data according to one embodiment.

FIG. 1 illustrates an exemplary enterprise information system (EIS) with distributed session data according to one embodiment. Enterprise server 102 may include one or more servers (e.g. web servers) that provide content to the clients 100 over network 10. Network 10 may be a wired or wireless network or a combination thereof, and may include a LAN, WAN, Internet, or a combination thereof. Any of a variety of one or more networking protocols may be used in the network, for example, TCP/IP. Application servers 104A and 104B may include processes 106A and 106B respectively that may be used by the clients 100 to apply business logic to enterprise data. Application servers 104A and 104B may include client states 108A and 108B respectively. Clients 100A, 100B, and 100C may be any of a variation of devices such as desktop personal computers, laptops, PDAs, and point-of-sale terminals running client applications such as web browsers.

Session data may include, but is not limited to, information related to environmental attributes, processes, and client-server interaction. For example, clients 100 may include web browsers accessing content generated by applications of application servers 104. The client states 108 are local instances of session data maintained by the application servers, for example, for use by clients of the application servers or by processes executing within the application servers. Distributed store 110 may store persistent data including one or more instances of primary state 112. Primary state 112 may include an instance of the session data that is globally accessible by the application servers. In one embodiment, primary state 112 may be distributed on the network across one or more computer-accessible mediums (e.g. RAID systems and/or database systems). In one embodiment, one or more instances or copies of primary state 112 may be maintained on one or more backend systems that may serve as, for example, backup systems and/or fail-over systems. In one embodiment, distributed store 110 may include storage on one or more computer systems that also host one or more of application servers 104.

The clients 100 may access enterprise server 102 via network 10. Enterprise server 102 may be implemented or clustered across one or more of the same computer systems as application servers 104, or on one or more separate computer systems. Enterprise server 102 may serve as a front end to the application servers for the clients 100. A client 100 may access enterprise server 102 during a session or during multiple sessions. In one embodiment, the applications and/or processes within the application servers may provide data and/or services to enterprise server 102, for example, for use by the clients. The application server may send updates of session data to distributed store 110 in response to an event such as a modification of one or more attributes of a client state 108 and/or as routine maintenance to synchronize the primary state with the client states. An attribute may be a portion or element of the session data, and may be one of any of various types of data that may be used in a session such as programming language objects or classes (e.g. Java objects or classes), strings, integers, Booleans, characters, real number representations, or any other type of computer-representable data.

In one embodiment, to access session data, a process 106 executing within an application server 104 may request a lock (e.g. mutex lock) of the primary state from distributed store 110. If another process does not currently have the primary state locked, distributed store 110 may issue the lock to the requesting process 106. If another process has the primary state locked, the process requesting the lock may enter a wait state or alternatively may continue executing another task while waiting for the lock. In one embodiment, a 'lazy' locking mechanism may be used in which when the process no longer requires locked access, the process does not release the lock immediately but may instead wait for a request for the lock. For example, the distributed store may request the lock from a process holding the lock in response to another process requesting a lock of the primary state.

In one embodiment, access to the primary state may be locked to allow a process or thread access to the primary state while blocking access to the primary state by other processes or threads. In one embodiment, locking of the primary state may be provided by a data synchronization mechanism.

In one embodiment, the process of locking the primary state may include obtaining a token. The token may include, but is not limited to, a string or a numeric identifier. A process or thread may request locked access to the primary state from a locking mechanism. The locking mechanism may send a reply message to the process or thread including a token. The process or thread may access the primary state after receiving the token. The process or thread may release the lock on the primary state by sending a release message to the locking mechanism including the token. A process or thread that does not hold a token may not be allowed access to the primary state until the process or thread requests and receives the token.

In one embodiment, a global lock may be provided at the process level and atomic locks may be provided at the thread level. A global lock may be used to restrict concurrent access to the primary state at the process level. The threads within the process having the global lock may use a thread-level lock to restrict access to portions of the session data of the primary state to a thread within the process holding the global lock. The thread-level lock may block other threads within the process from concurrently accessing the locked portion of the session data. The other threads may continue executing and one or more other threads within the process may lock other portions of the session data while the first thread is holding the lock on the first portion of the session data unless they require access to the portions of the session data that are locked at the thread level, at which point a thread may enter a wait state to wait for the thread holding the lock to release the lock.

Figure 2A:
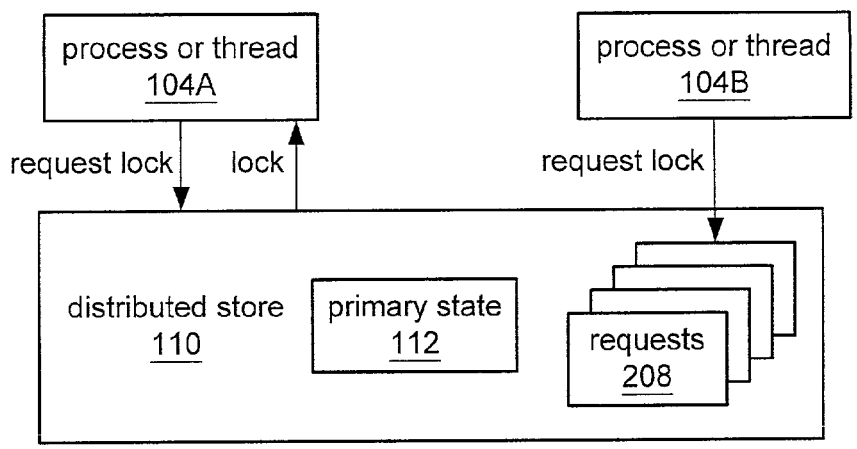
FIGS. 2A, 2B, and 2C illustrate a locking mechanism for controlling access to a primary state according to one embodiment.
Figure 2B:
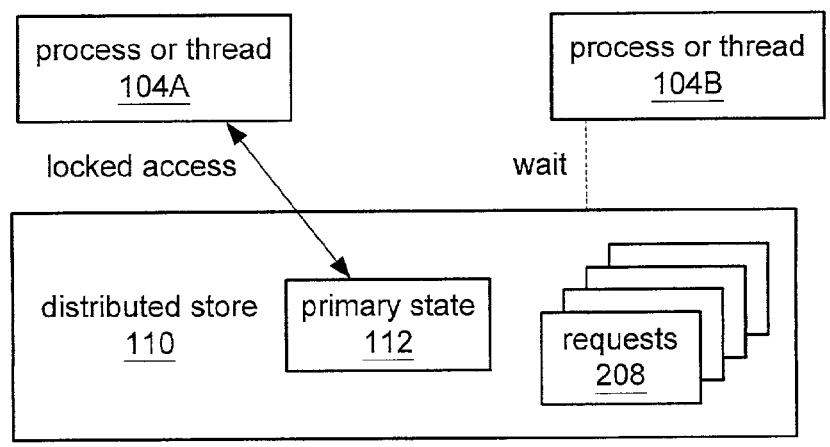
Figure 2C:
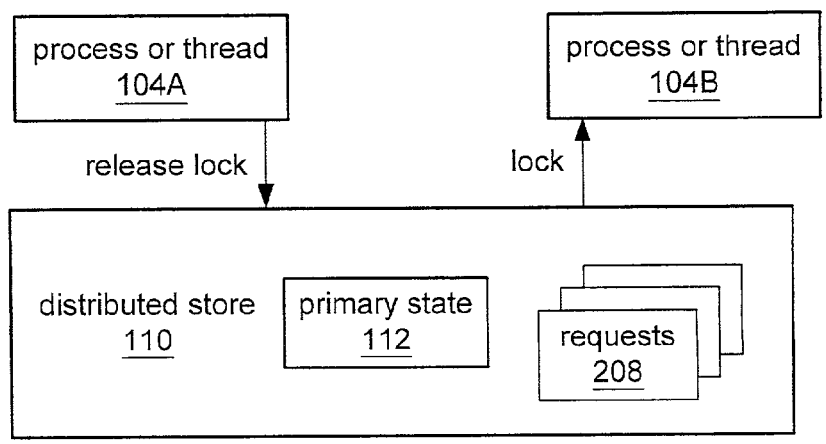

FIGS. 2A, 2B, and 2C illustrate a locking mechanism for controlling access to a primary state according to one embodiment. In FIG. 2A, a process requests locked access to a primary state of session data on a distributed store. A process 104 may request locked access to primary state 112, for example, to update the primary state with modified session data. Distributed store 110 may issue a lock to the requesting process in response to the request.

In one embodiment, a lock may be required for every access to the primary state 112. Using the lock, a process 104 may prevent other processes and/or threads on the application server or other application servers from accessing the primary state. The lock may be obtained and released on an access-by-access basis such that each time a process needs to access the primary state it must first obtain the lock for that primary state and then release the lock upon completion of its access. In another embodiment, after a process obtains a lock for a primary state, it may continue to hold the lock after it has completed accessing the corresponding primary state. For example, in such an embodiment, the process holding the lock may not release the lock until after the it is requested to release the lock (e.g. by another process or by the distributed store manager). By holding the lock, a process that frequently accesses the same primary state may reduce its amount of lock requests.

Another embodiment may provide a global locking mechanism at the process level and a thread-level locking mechanism for threads within a process currently holding a global lock of the primary state. The thread-level lock may allow threads to perform atomic-level locking of the session data. The global/thread level locking mechanism may decrease the blocking that may be caused by per-access locking. Locking for individual thread-level access of the corresponding primary state may be handled more efficiently within the process and thus reduce the amount of process-level lock requests.

Another process 104B executing within the same or a different application server, at some point, may request locked access to primary state 112. If process 104A has primary state 112 locked, distributed store 110 may hold (e.g. queue) the request 208. In FIG. 2B, process 104B, or alternatively one or more threads within process 104B that requested the lock, may be blocked and thus may be in a wait state until the lock is granted.

In FIG. 2C, application server 104A releases the lock, and locked access is provided to process 104B. In one embodiment, process 104A may release the lock when done accessing primary state 112. In another embodiment, a 'lazy' release strategy may be used, wherein process 104A holds the lock until requested to release the lock. For example, distributed store 110 may request the lock from process 104A in response to receiving the request for locked access from process 104B. In one embodiment, process 104A may notify distributed store 110 of the release of the lock. In one embodiment, a lock release message may be sent from the process to the distributed store.

Figure 3:
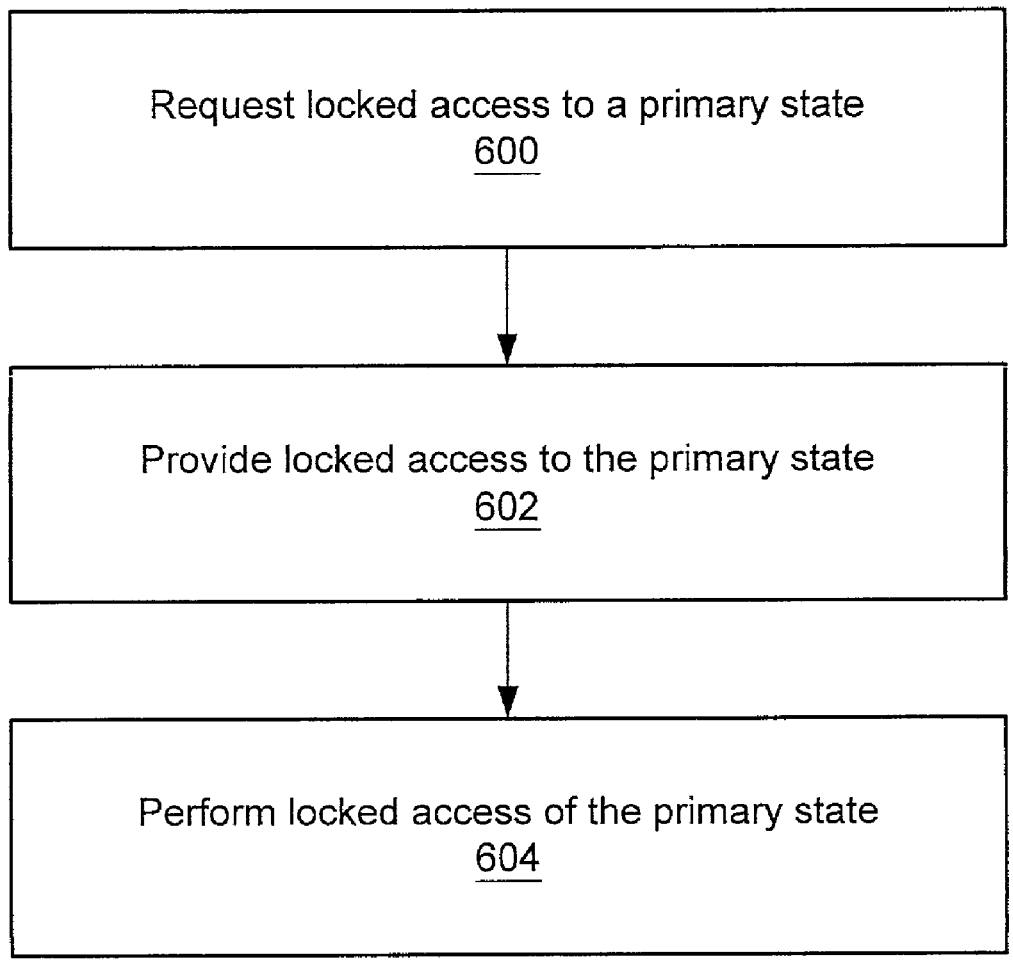
FIG. 3 illustrates a method for providing locked access to a primary state of session data according to one embodiment.

FIG. 3 illustrates a method for providing locked access to a primary state of session data according to one embodiment. A process or thread may require access to a primary state of session data, and to protect the primary state from concurrent access by other processes or threads, the process or thread may request locked access to the primary state as indicated at 600. For example, a client state of the session data on an application server may have been modified, and a process may request locked access to the primary state to synchronize the primary state with the client state on the application server.

If another process or thread does not have the primary state locked, locked access may be provide to the requesting process or thread as indicated at 602. In one embodiment, the locked access may be provided by sending a token to the requesting process or thread. While holding the locked access, the process or thread may access the primary state as indicated at 604, and other processes or threads may not be allowed access to the primary state. Using the locking mechanism, data loss and/or incoherent data that may result from other processes and/or threads concurrently accessing the primary state of the session data may be prevented.

In one embodiment, locked access may be granted globally at the process level and thus may prevent any other process or thread from accessing the primary state while the process holds the locked access. In another embodiment, locked access may be granted globally at the process level and locally at the thread level for threads of a process currently holding the process level lock, thus allowing for atomic locking of portions of the session data of the primary state by threads within the process. In one embodiment, process-level locked access may be managed through a distributed store data synchronization layer (e.g. distributed store manager) and the thread-level locked access may be managed within a process that holds the global lock. Thread-level locked access may allow threads within the process currently holding the global lock to lock the session data at a more atomic level, as opposed to the global lock which locks the entire primary state. Thread-level locked access may be used to prevent threads within the process from concurrently accessing locked portions of the session data. In one embodiment, one or more threads within the process may lock other portions of the session data while a first thread is holding locked access on a first portion of the session data. In one embodiment, if a thread requires access to a locked portion of the session data, the thread may enter a wait state to wait for the locked access to be released.

Figure 4:
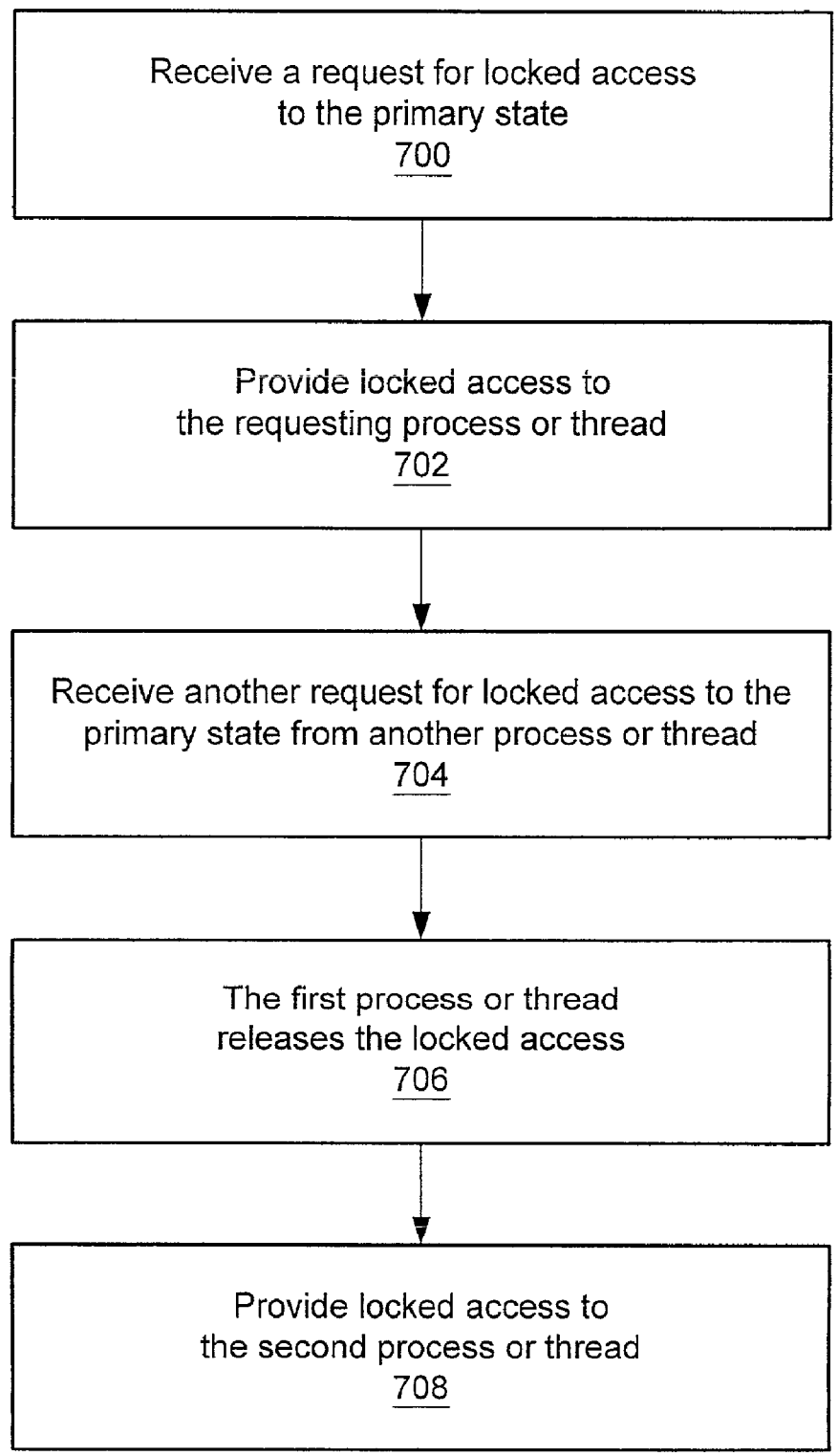
FIG. 4 illustrates a method for providing locked access to a primary state according to one embodiment.

FIG. 4 illustrates a method for providing locked access to a primary state according to one embodiment. A request for locked access to the primary state may be received from a process or thread as indicated at 700. If another process or thread does not currently hold locked access, locked access to the primary state may be provided to the requesting process or thread as indicated at 702. Another request for locked access may be received from another process or thread as indicated at 704. If the first process or thread currently holds locked access to the primary state, locked access may not be immediately granted to the other process or thread, but instead, the request may be held awaiting release of the locked access by the process or thread. In one embodiment, a request for locked access that is not immediately granted may be buffered with other pending requests for locked access, if any.

When the process or thread holding the locked access no longer requires locked access, the process or thread may release the locked as indicated at 706. In some embodiments, the process or thread may release the locked access when it no longer requires locked access to the primary store. In other embodiments, the process may 'lazily' release the locked access; in other words, the process or thread may hold the locked access until receiving a request for release of the locked access. As indicated at 708, after the locked access is released by the process or thread, locked access to the primary state may be provided to the other process or thread that requested locked access at 704.

Figure 5:
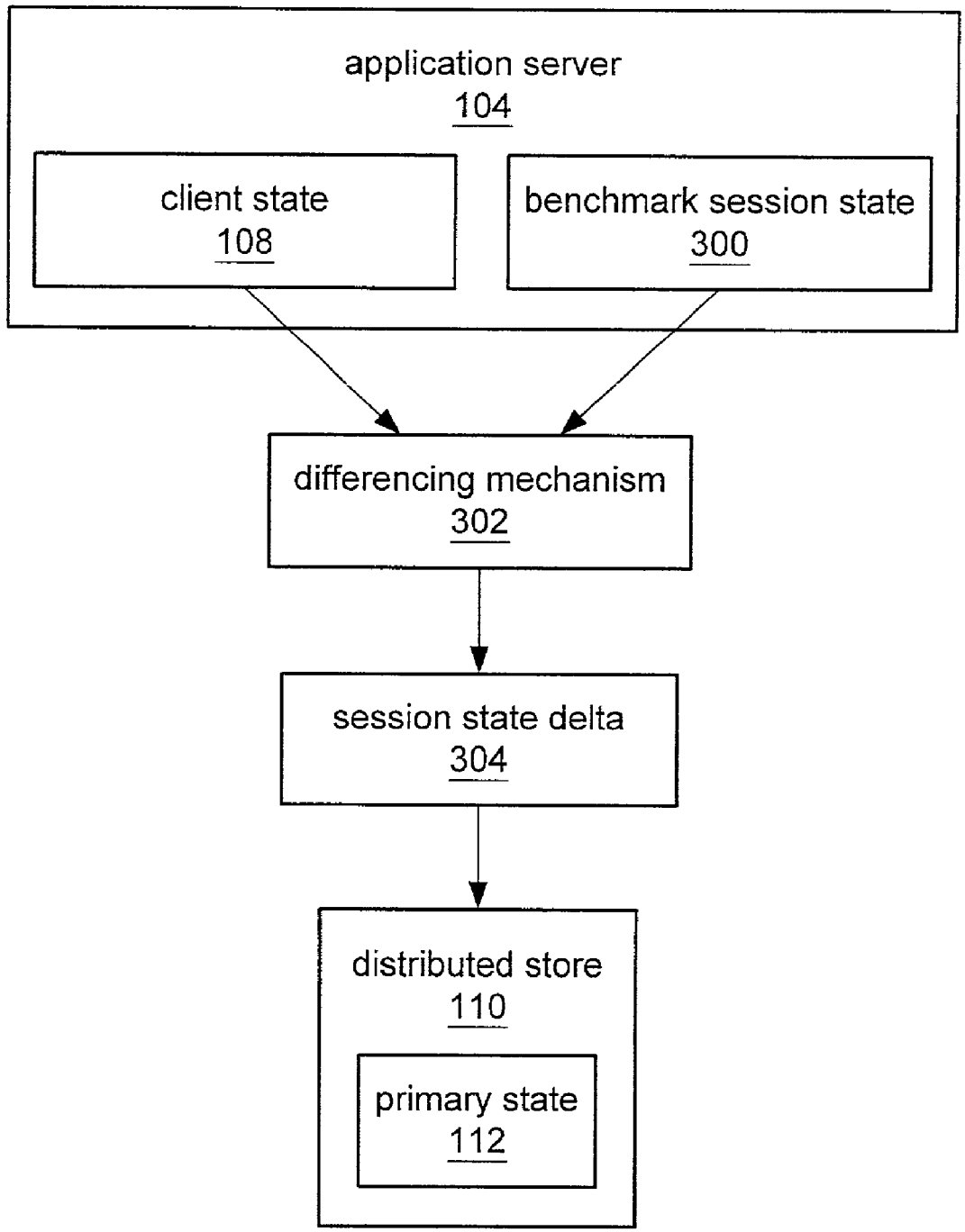
FIG. 5 illustrates a differencing mechanism for providing modified session data to a distributed store according to one embodiment.

FIG. 5 illustrates a differencing mechanism for providing modified session data to a distributed store according to one embodiment. Application server 104 may include client state 108. In one embodiment, application server 104 may obtain locked access to the primary state 112 included in distributed store 110. Application server 104 may provide client state 108 to differencing mechanism 302. In one embodiment, application server 104 may provide benchmark client state 300 to the differencing mechanism. In other embodiments, distributed store 110 may provide benchmark client state 300 to the differencing mechanism. In yet other embodiments, differencing mechanism 302 may access the benchmark client state 300 from other sources. Differencing mechanism 302 may generate a client state delta 304 between client state 108 and benchmark client state 300. In one embodiment, client state delta 304 may include session data from client state 108 that differs from benchmark client state 300 as determined by the differencing mechanism.

In one embodiment, differencing mechanism 302 may perform a binary comparison of client state 108 with benchmark client state 300 to generate client state delta 304. In performing a binary comparison, the bits of one set of data are compared to bits of another set of data. In some embodiments, this comparison may be done n bits at a time. For example, the data may be compared byte by byte or alternatively by any n-bit boundary suitable for the data comparison. In one embodiment, client state delta 304 may include one or more attributes of the session data that the binary comparison of the data determined to be different between the client state and the benchmark client state.

In another embodiment, differencing mechanism 302 may use object graph differencing to compare an object graph representation of client state 108 with an object graph representation of benchmark client state 300 to generate client state delta 304. An object graph may include a directed graph representation of an object's members and descendent members (i.e. members of members). Finding the differences between two objects may include comparing the structure of one object's directed graph representation with the structure of the other object's directed graph representation. In one embodiment, client state delta 304 may include one or more attributes of the session data that the object graph comparison of the data determined to be different between the client state and the benchmark client state. In one embodiment, an object graph comparison may be used to determine which portions of attributes have been modified. In such an embodiment, only the modified portions of attributes may be used to update the session data saving resources (e.g. network resources) in comparison to using whole attributes to update the session data.

In other embodiments, other differencing methods may be used to generate client state delta 304. After differencing mechanism 302 generates client state delta 304, distributed store 110 may use the client state delta 304 to synchronize primary state 112 with client state 108. The differencing mechanism may be used to determine modified client state attributes and may reduce the load on resources (e.g. the network) by sending modified portions and not sending unmodified portions of the session data to the distributed store 110 during the synchronization process.

Figure 6:
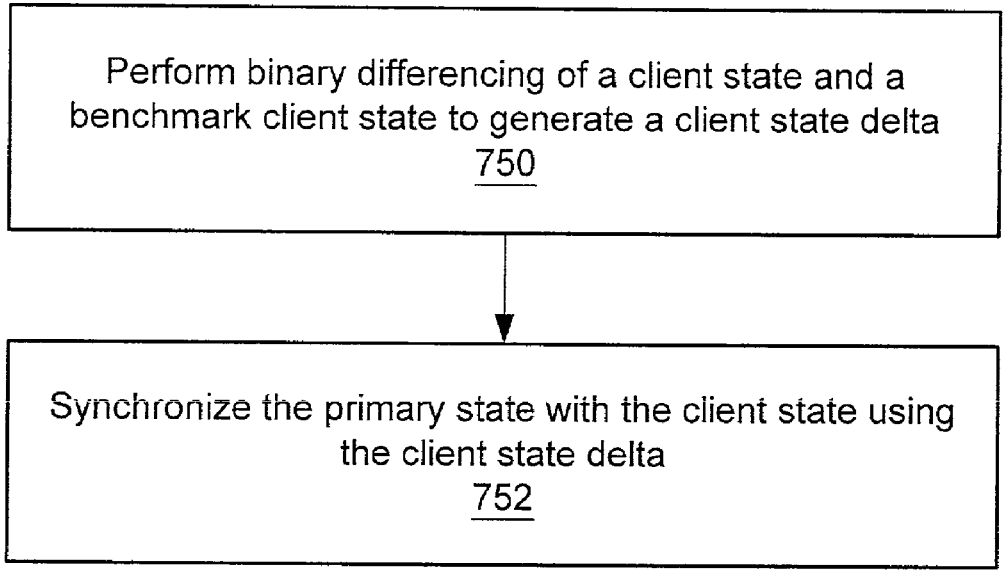
FIG. 6 illustrates a method for using binary differencing to determine a client state delta according to one embodiment.

FIG. 6 illustrates a method for using binary differencing to determine a client state delta according to one embodiment. A client state on an application server may have been modified and thus not be synchronized with the primary state. For example, one or more attributes of the session data in the client state may have been modified.

As indicated at 750, binary differencing may be performed on the client state and a benchmark of the client state to generate a client state delta, as indicated at 750. In binary differencing, the client state may be compared to the benchmark client state n bits at a time to determine which portions (e.g. attributes) differ between the client state and the primary state. The client state delta may include information identifying the one or more attributes of the client state that have been modified as determined by the binary differencing. The primary state may be synchronized with the client state using the identified modified attributes as indicated at 752.

Figure 7:
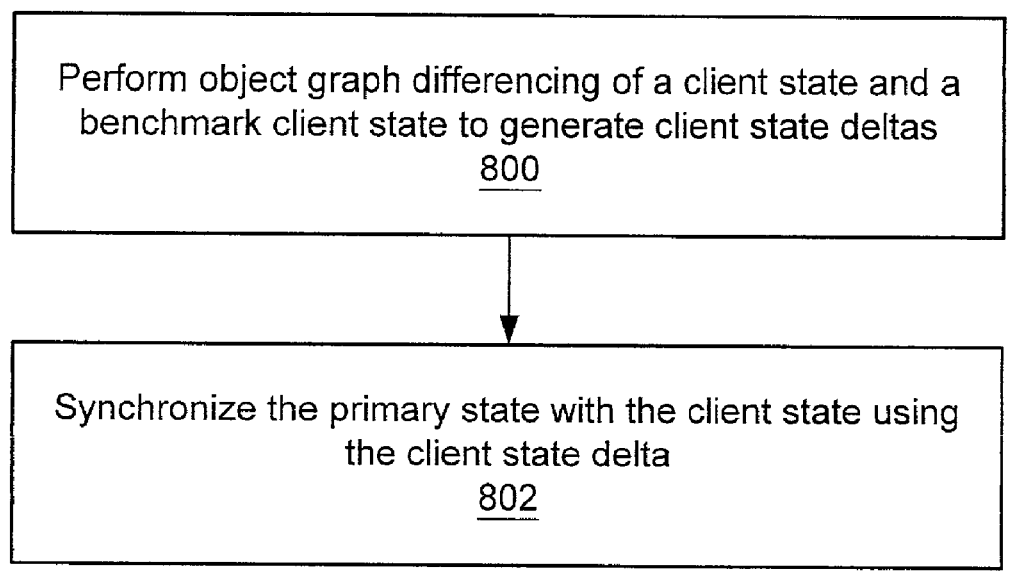
FIG. 7 illustrates a method for using object graph differencing to determine a client state delta according to one embodiment.

FIG. 7 illustrates a method for using object graph differencing to determine a client state delta according to one embodiment. A client state on an application server may have been modified and thus not be synchronized with the primary state. For example, one or more attributes of the session data in the client state may have been modified.

As indicated at 800, object graph differencing of the client state and a benchmark of the client state may be may be performed to generate a client state delta. In one embodiment, the attributes of the session data comprise objects that may be organized according to an object graph representation. An object graph may include a directed graph representation of an object's members and descendent members (i.e. members of members). Finding the differences between two objects may include comparing the structure of one object's directed graph representation with the structure of the other object's directed graph representation. In performing object graph differencing, structures of the object graph representation of the client state may be compared to corresponding structures of an object graph representation of the benchmark of the client state to identify the modified attributes of the client state. The client state delta may include information identifying the one or more attributes of the client state that have been modified as determined by the object graph differencing. The primary state may be synchronized with the client state using the identified modified attributes as indicated at 802. In one embodiment, an object graph differencing may determine which portions of attributes have been modified. In such an embodiment, only the modified portions of attributes may be used to synchronize the primary state with the client state potentially saving resources (e.g. network resources) in comparison to using whole attributes to update the session data.

Figure 8A:
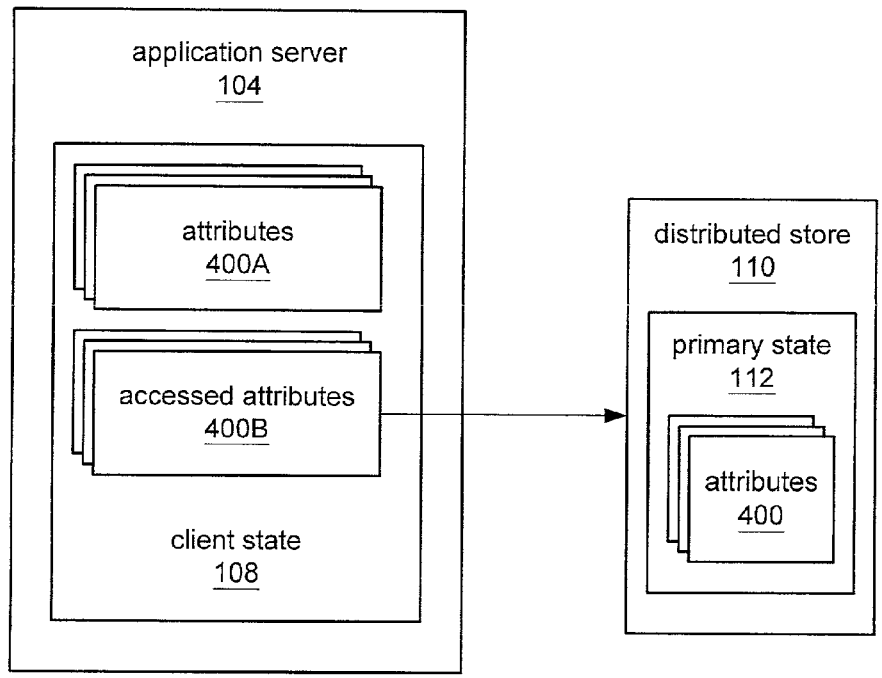
FIGS. 8A and 8B illustrate embodiments of determining accessed attributes of session data.
Figure 8B:
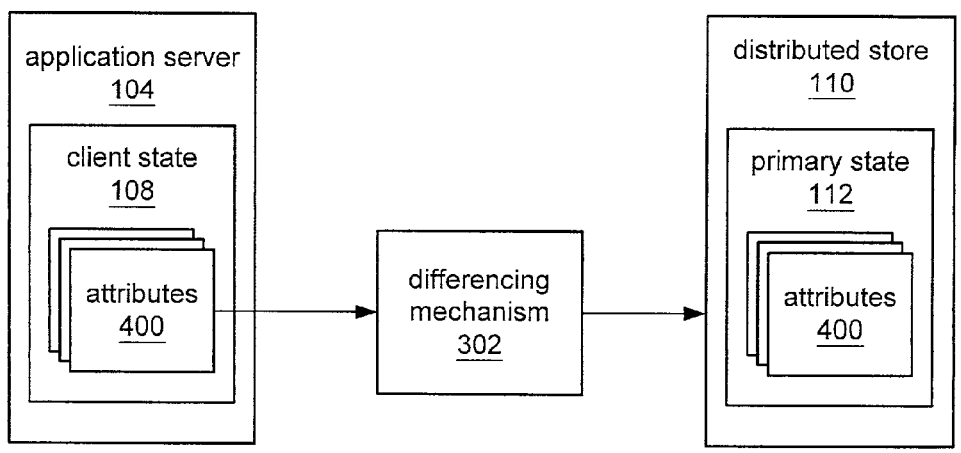

FIGS. 8A and 8B illustrate embodiments of determining accessed attributes of session data. Client state 108 may be a local instance of session data, accessible for read and write access by processes and threads within application server 104, for example, in response to client interaction with application server 104. Primary state 112 may be a global instance of the session data accessible by a plurality of application servers. One or more processes on application server 104 may access one or more of attributes 400 of client state 108. One or more others of attributes 400 may not be accessed. In one embodiment, all attributes (accessed or not) may be provided to distributed store 110 to synchronize the primary state with the client state. Other embodiments may track accessed attributes and provide only the accessed attributes to the distributed store. In such embodiments, unaccessed attributes may be unchanged. Thus, saving only the accessed attributes may correctly synchronize the primary state while reducing synchronization overhead as compared to sending all attributes (including unaccessed attributes) to the distributed store during the synchronization process.

In one embodiment, as illustrated in FIG. 8A, during the synchronization process, application server 104 may obtain locked access to primary state 112 on distributed store 110. Application server 104 may maintain information on which of the attributes 400 of client state 108 have been accessed. In one embodiment, information on accessed attributes may be a list of keys or names identifying the accessed attributes 400B. Application server 104 may provide the tracked accessed attributes 400B to distributed store 110 for updating the primary state 112 as indicated in FIG. 8A. Attributes that were not accessed do not require updating and thus are not tracked and are not provided to the distributed store. Providing only the accessed attributes to the distributed store for updating of the primary state may reduce the overhead on resources such as network resources caused by synchronizing the primary store and the client state.

Some attributes may be immutable attributes (e.g. constants or immutable objects). In one embodiment, a set of attributes of a client state may be generated to be used in synchronizing the primary state with the client state, and immutable attributes may be excluded from the set of attributes. The set of attributes may then be provided to the distributed store and used in synchronizing the primary state with the client state. Thus, immutable attributes may be excluded during the synchronization process, which may reduce bandwidth usage and/or other resource usage during the synchronization process. In one embodiment, attributes that were not accessed may also be excluded from the set of attributes. In one embodiment, attributes that were accessed only with an immutable access may also be excluded from the set of attributes. In one embodiment, immutable attributes may include one or more attributes which have been designated as immutable attributes in response to user input.

In one embodiment, application server 104 may distinguish between mutable accesses to the session data and immutable accesses to the session data. For example, a write access may be a mutable access, and a read access may be an immutable access. In this embodiment, only attributes that were mutably accessed may be tracked and provided to the distributed store, and thus attributes that were only immutably accessed may be excluded during the synchronization process, which may reduce bandwidth usage and/or other resource usage during the synchronization process.

Some attributes of the session data may be classified as mutable (e.g. writable) attributes. In one embodiment, a mutable attribute may be marked as being modified in response to any access to that attribute. Alternatively, a mutable attribute may be marked as modified in response to a write access, but not in response to a read access. Other attributes may be classified as immutable (read-only). In one embodiment, immutable accesses are not tracked and thus not provided to the distributed store during the synchronization process. Other attributes may not be classified (e.g. as mutable or immutable). Such attributes may be tracked only if mutably accessed.

In one embodiment, as illustrated in FIG. 8B, the attributes may be provided to a differencing mechanism 302 that may determine which of the provided attributes have been modified. In one embodiment, all attributes may be provided to the differencing mechanism. In another embodiment, attributes may be tracked according to one of or according to a combination of the tracking techniques described above, and only the tracked attributes may be provided to the differencing mechanism. For example, in one embodiment only accessed attributes are provided to the differencing mechanism, which may then determine which of the accessed attributes were actually modified. In yet another embodiment, mutably accessed attributes may be tracked, and only the mutably accessed attributes may be provided to the differencing mechanism, which may then determine which of the mutably accessed attributes were actually modified. In still yet another embodiment, accessed mutable attributes may be tracked, and only the accessed mutable attributes may be provided to the differencing mechanism, which may then determine which of the accessed mutable attributes were actually modified.

In one embodiment, differencing mechanism 302 may use a binary differencing method to compare the provided attributes to a set of benchmark attributes to determine the modified attributes. In another embodiment, differencing mechanism 302 may use an object graph differencing method to compare the provided attributes to a set of benchmark attributes to determine the modified attributes and/or modified portions of attributes. In other embodiments, differencing mechanism 302 may use other methods to determine the modified attributes.

Differencing mechanism 302 may provide the determined modified attributes to distributed store 110 for updating primary state 112. Differencing mechanism 302 may allow modified attributes to be identified so that the load on resources (e.g. the network) may be reduced by sending only modified portions and not unmodified portions of the session data to the distributed store 110 during the synchronization process.

Figure 9:
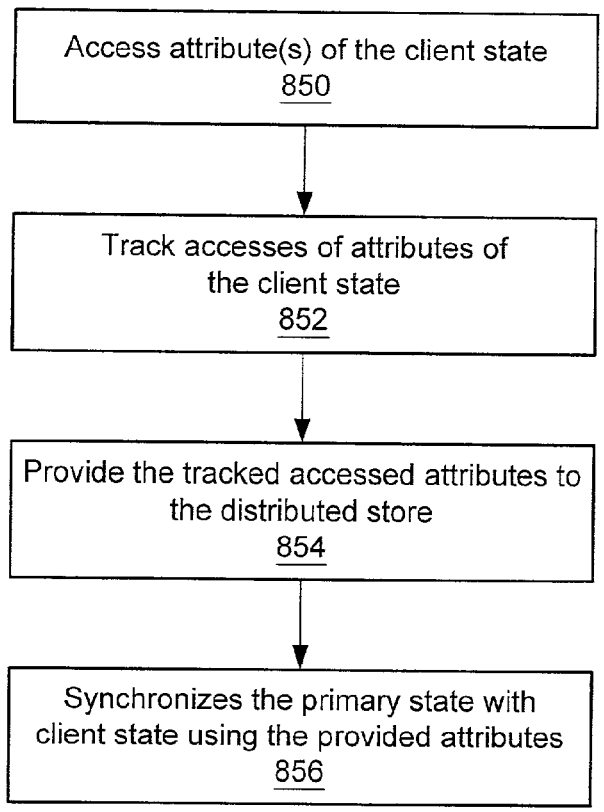
FIG. 9 illustrates embodiments of a method of tracking accessed attributes. In one embodiment, the application server may include a client state.

FIG. 9 illustrates a method of tracking accessed attributes, according to one embodiment. The application serve may include a client state. The client state may be a local instance of session data, accessible by processes and threads within the application server, for example, in response to client interaction with the application server. A distributed store may include a primary state of the session data. The primary state may be a global instance of the session data accessible by a plurality of application servers.

One or more attributes of the session data may be accessed, as indicated at 850, for example by processes and/or threads within an application server. As indicated at 852, the attributes of the client state that are accessed may be tracked, for example by a state manager component of the application server. In one embodiment, a list of keys or names identifying the accessed attributes may be kept. In another embodiment, the application server may distinguish between mutable accesses to the session data and immutable accesses to the session data. For example, a write access may be a mutable access, and a read access may be an immutable access. In this embodiment, only attributes that were mutably accessed may be tracked. In yet another embodiment, some attributes of the session data may be classified as mutable attributes. Any access to a mutable attribute may result in the attribute being marked or listed as being modified. Other attributes may be classified as immutable. In one embodiment, immutable attributes are not tracked.

The tracked accessed attributes may be provided to the distributed store, as indicated at 854. In one embodiment, the tracked accessed attributes may be compared to an original or benchmark version of the attributes to determine which of the tracked accessed attributes were actually modified. In one embodiment, this comparison may employ a binary differencing method to compare the provided attributes to a set of benchmark attributes to determine the modified attributes. In another embodiment, an object graph differencing method may be employed to compare the provided attributes to a set of benchmark attributes to determine the modified attributes and/or modified portions of attributes. The primary state and the client state may then be synchronized using the modified attributes and/or modified portions of attributes, as indicated at 856.

Figure 10:
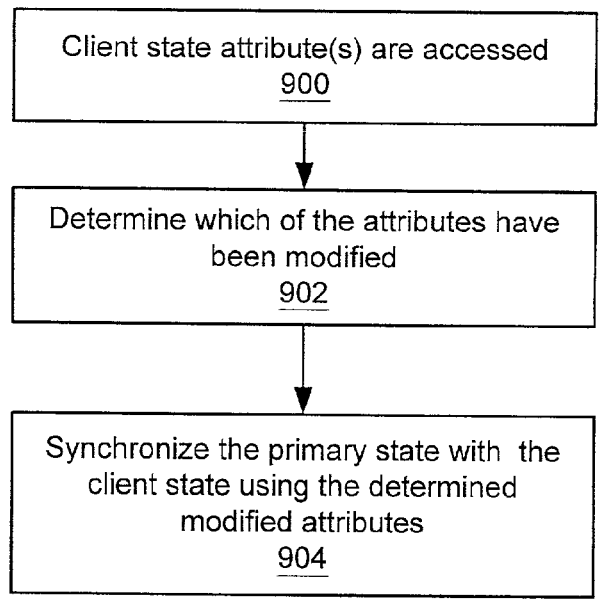
FIG. 10 illustrates embodiments of a method of providing attributes to a distributed store according for synchronization of a primary state with a client state.

FIG. 10 illustrates a method for providing attributes to a distributed store during synchronization of a primary state with a client state, according to one embodiment. A client state of session data may be accessed, as indicated at 900, for example by one or more processes executing within an application server. In one embodiment, information may be maintained on which of the attributes of the session data have been accessed. In one embodiment, the information on accessed attributes may include a list of keys or names identifying the accessed attributes.

The method may include determining which attributes were modified as indicated at 902. In one embodiment, a differencing component of the application server may determine which attributes were modified. In one embodiment, a binary differencing method may be used to compare the client state attributes to a benchmark or original of the attributes to determine the modified attributes. In another embodiment, an object graph differencing method may be used to compare the client state attributes to a benchmark of the attributes to determine the modified attributes. In other embodiments, other methods to determine the modified attributes. In some embodiments, the method used to determine which attributes have been modified (binary diff, object graph diff, etc.) may applied to only certain attributes. For example, in one embodiment, the only the accessed attributes are checked for changes since unaccessed attributes presumably were not changed. In yet another embodiment, in addition to eliminating unaccessed attributes from the determination process, attribute that were not accessed by a mutable access are also eliminated from the determination process. In one embodiment, only the mutably accessed attributes are checked to determine which of the mutably accessed attributes were actually modified. In still yet another embodiment, only attributes classified as mutable are checked for changes. Attributes classified as immutable may be eliminated from the determination process. Mutable attributes that have not been accessed or that have been accessed by a non-mutable access (e.g.) may also be eliminated (not checked) when determining which of the accessed mutable attributes were actually modified.

The method may then include synchronizing a corresponding primary state (e.g. in a distributed store) with the client state using the modified attributes, as indicated at 904. In one embodiment, only the attributes determined to have been modified are used for the synchronizing. For example, in one embodiment, unmodified client state attributes need not be sent when updating the corresponding primary state in a distributed store.

Figure 11:
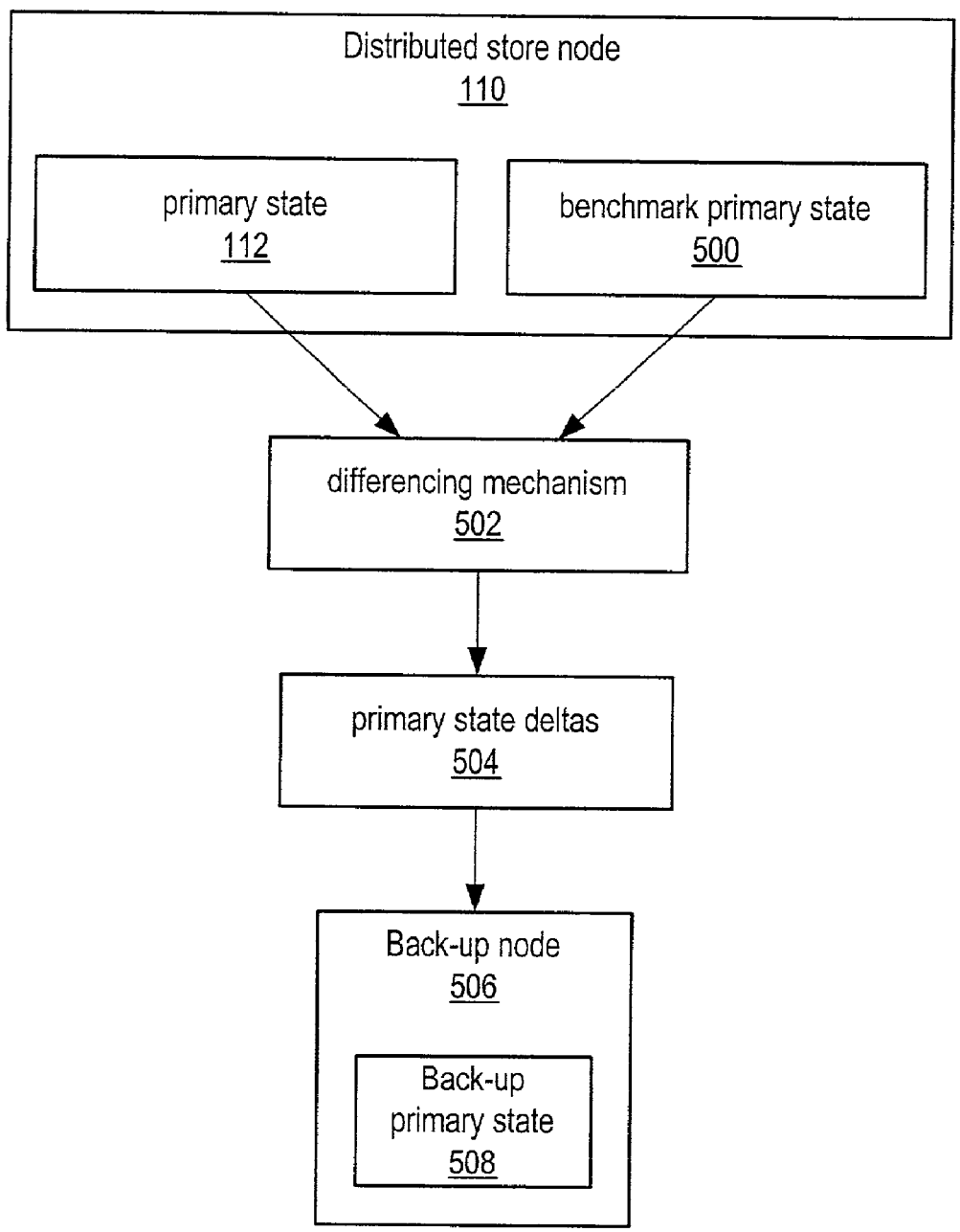
FIG. 11 illustrates a distributed store using a differencing mechanism to synchronize instances of a primary state according to one embodiment.

FIG. 11 illustrates a distributed store node using a differencing mechanism to synchronize instances of a primary, state to a back-up node, according to one embodiment. Distributed store node 110 may include a primary state 112 of session data. In one embodiment, distributed store node 110 is part of or associated with one of one or more application servers in a distributed or clustered system. In one embodiment, the primary state may be distributed across multiple stores (e.g. computer-accessible mediums and/or other systems). Back-up node 506 may be another distributed store node associated with another application server in the system. In another embodiment, back-up node 506 may be part of a backend system or a dedicated back-up system.

One or more additional instances of the primary state may serve as backup copies of the primary state and may themselves be stored on different nodes of the distributed store system, or alternatively on other systems and/or backend systems. In one embodiment, these other instances of the primary state may be distributed across multiple computer-accessible mediums and/or other systems. It may be necessary or desirable to maintain synchronization between the various instances of the primary state.

In one embodiment, distributed store node 110 may retain a benchmark state 500. This benchmark state 500 may be a copy of or otherwise indicate a back-up instance of the primary state on one or more other nodes. In other embodiments, benchmark state 500 may be stored elsewhere and be provided to or accessed by the differencing mechanism 502. Differencing mechanism 502 may generate a primary state delta 504 between primary state 112 and the benchmark state 500. Primary state delta 504 may indicate differences in session data between the primary state 112 and the benchmark state 500.

In one embodiment, differencing mechanism 502 may perform a binary comparison of primary state 112 with benchmark state 500 to generate primary state delta 504. In performing a binary comparison, the bits of one set of data are compared to the bits of the other set of data. In one embodiment, this comparison may be done n bits at a time. For example, the data may be compared byte by byte or alternatively by any n-bit boundary suitable for the data. In one embodiment, primary state delta 504 may include one or more attributes of the session data that the binary comparison determined to be different between the primary state 112 and the benchmark primary state 500.

In another embodiment, differencing mechanism 502 may use object graph differencing to compare an object graph representation of primary state 112 with an object graph representation of benchmark primary state 500 to generate primary state delta 504. An object graph may include a directed graph representation of an object's members and descendent members (i.e. members of members). Finding the differences between two objects may include comparing the structure of one object's directed graph representation with the structure of the other object's directed graph representation. In one embodiment, primary state delta 504 may include one or more attributes of the session data that the object graph comparison determined to be different between the primary state 112 and the benchmark primary state 500. In one embodiment, primary state delta 504 may include one or more portions of attributes of the session data that the object graph comparison determined to be different between the primary state 112 and the benchmark primary state 500. In other embodiments, differencing mechanism 502 may use other methods to generate primary state delta 504. In some embodiments, regardless what comparison mechanism is employed, the comparison may be simplified by eliminating from the comparison attributes and/or portions of attributes of the primary state classified as immutable attributes.

After differencing mechanism 502 generates primary state delta 504, distributed store node 110 may provide primary state delta 504 to back-up node 506, and back-up node 506 may synchronize its instance of the primary state data 508 with the primary state 112 using primary state delta 504. The differencing mechanism 502 may provide a mechanism for obtaining modified attributes so that the load on resources (e.g. the network) may be reduced by sending only the modified and not the unmodified portions of the session data to the backend system 506. In another embodiment, instead of comparing the primary state 112 to a benchmark state 500, differencing mechanism 502 eliminate immutable attributes from the primary state 112 and supply the remaining attributes as primary state deltas 504.

In one embodiment, other instances of the primary state may be synchronized using the primary state delta 504 provided by the differencing mechanism 502. Synchronizing the other instances of the primary state using the primary state may use fewer resources, such as network bandwidth, than sending the entire primary state during the synchronizing process. Alternatively, other instances of the primary state may be replaced or synchronized as described above with the newly synchronized instance from the back-up node 506. Other embodiments may use other methods to synchronize the other instances.

Figure 12:
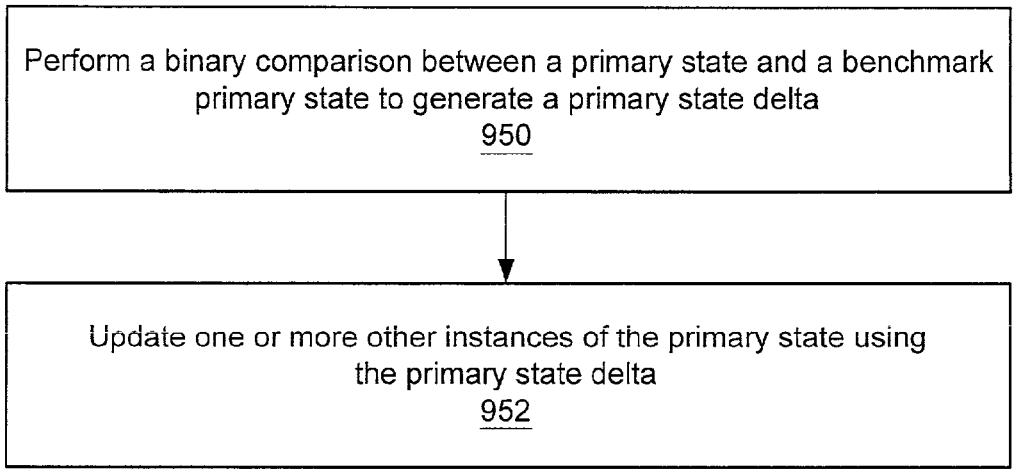
FIG. 12 illustrates a method for updating instances of a primary state using binary differencing to determine a primary state delta according to one embodiment.

FIG. 12 illustrates a method for updating one or more back-up instances of a primary state using binary differencing to determine a primary state delta according to one embodiment. A binary comparison of the primary state and a benchmark of the primary state may be performed to generate a primary state delta, as indicated at 950. For example, the bits of the primary state may be compared to the bits of the benchmark primary state n bits at a time to determine modified attributes. In one embodiment, the primary state delta may include one or more attributes of the session data that the binary comparison determined to be different between the primary state and the benchmark primary state. After generation of the primary state delta, the primary state delta may be used to synchronize the back-up instances of the primary state on one or more back-up nodes, as indicated at 952. Alternatively, one or more instance of the primary state may be synchronized using the primary state delta, and one or more other instances of the primary state may be replaced with one of the newly synchronized instance.

Figure 13:
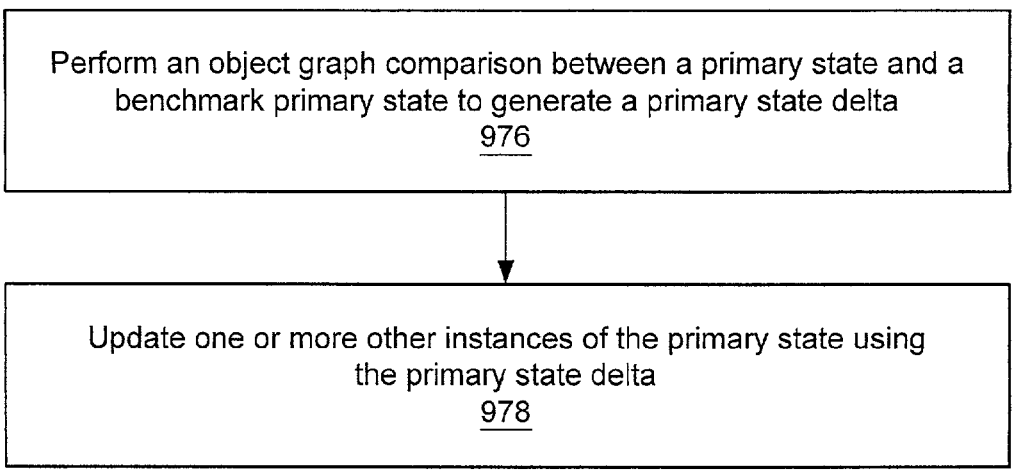
FIG. 13 illustrates a method for updating instances of a primary state using object graph differencing to determine a primary state delta according to one embodiment.

FIG. 13 illustrates a method for updating instances of a primary state using object graph differencing to determine a primary state delta, according to one embodiment. The method may include performing an object graph comparison of the primary state and a benchmark of the primary state to generate a primary state delta, as indicated at 976. The object graph comparison may find the differences between the primary state and the benchmark primary state by traversing and comparing an object graph representation of the primary state with an object graph representation of the benchmark primary state. An object graph may include a directed graph representation of an object's members and descendent members (i.e. members of members). In one embodiment, the primary state delta may include one or more attributes and/or portions of attributes of the session data that the object graph comparison determines to be different between the primary state and the benchmark of the primary state. After generation of the primary state delta, the primary state delta may be used to synchronize other instances of the primary state, as indicated at 978. For example, the primary state delta may be sent to one or more back-up nodes of a distributed store.

Figure 14:
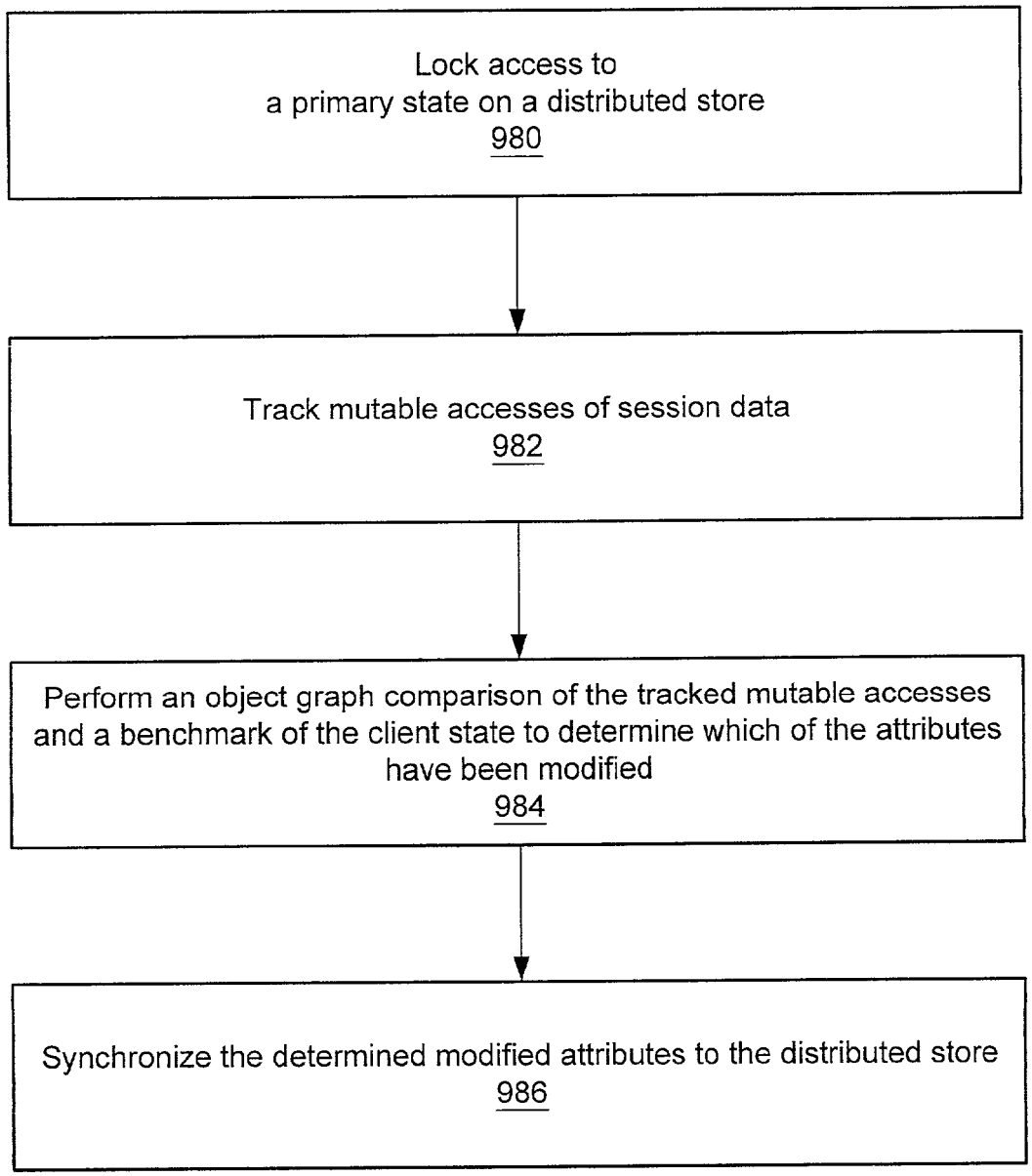
FIG. 14 illustrates a method of accessing and synchronizing state data according to one embodiment.

FIG. 14 illustrates a method of accessing and synchronizing state data according to one embodiment. A process executing on an application server, for example, may obtain locked access to a primary state of session data on a distributed store, as indicated at 980. In one embodiment, threads of the process may obtain more atomic locked access on the primary state. The process and/or the threads may access the primary state, and the application server may track mutable accesses (e.g. reads from mutable attributes and writes to any attributes) to the session data as indicated at 982. In one embodiment, the application server may maintain a list of keys or names of attributes that have been mutably accessed, and the application server may provide the list to the object graph differencing method. In another embodiment, accessed mutable attributes may be tracked, and only the accessed mutable attributes may be provided to the differencing mechanism, which may then determine which of the accessed mutable attributes were actually modified. The application server may provide the tracked mutably accessed attributes to an object graph differencing mechanism.

In one embodiment, the application server may provide a benchmark session data to the object graph differencing mechanism. In other embodiments, the object graph differencing mechanism may access the benchmark session data from other sources. An object graph comparison may be performed of an object graph representation of the mutably accessed attributes with an object graph representation of the benchmark session data to determine the modified attributes and/or modified portions of attributes, as indicate at 984.

The modified attributes and/or modified portions of attributes may be synchronized to a distributed store, as indicated at 986. The distributed store may update the primary state using the modified attributes. Using embodiments of the method illustrated in FIG. 14 may help prevent data loss and maintain synchronization between instances of state data of while preferably reducing the overhead of the synchronization process.

While embodiments of the system and method are described herein in respect to enterprise systems and/or application servers, it is noted that embodiments of the system and method may be used in various other application areas that require synchronization of data. For example, embodiments of the system and method may be applicable in peer-to-peer networks or other Internet client/server applications. In general, embodiments of the system and method as described herein may be used in any of a variety of environments that require synchronization of data.

Note that the methods described herein are exemplary and not intended to be limiting. The methods may be implemented in software, hardware, or a combination thereof. The order of methods may be changed, and various elements may be added, reordered, combined, omitted, modified, etc.

Various embodiments may further include receiving, sending or storing instructions and/or data implemented in accordance with the foregoing description upon a computer-accessible medium or article of manufacture. Generally speaking, a computer-accessible medium or article of manufacture may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a distributed store comprising a primary state of session data configured for access by a plurality of application servers, wherein the primary state of the session data comprises a plurality of attributes;
a first one of the application servers comprising a client state of the session data, wherein the application server is configured to provide access to the client state of the session data to processes executing within the application server;
wherein the system is configured to:
compare the client state to a benchmark of the client state to determine a subset of the attributes that have been modified in the client state; and
synchronize the primary state with the client state according to the subset of the attributes.

2. The system as recited in claim 1, wherein the application server is configured to provide access to the session data for one or more client sessions of the system.

3. The system as recited in claim 1, wherein, to compare the client state to a benchmark of the client state, the system is further configured to perform binary differencing of a binary representation of the client state and a binary representation of the benchmark of the client state to locate the modified attributes.

4. The system as recited in claim 1, wherein, to compare the client state to a benchmark of the client state, the system is further configured to perform object graph differencing of an object graph representation of the client state and an object graph representation of the benchmark of the client state.

5. The system as recited in claim 1, wherein the first application server is configured to track accesses of the attributes of the client state, wherein the system is configured to:

compare the tracked accessed attributes to a benchmark of the attributes of the client state to determine a subset of the tracked accessed attributes that have been modified in the client state; and
synchronize the primary state with the client state according to the subset of the tracked accessed attributes.

6. The system as recited in claim 5, wherein, to track accesses of the attributes of the client state, the first application server is further configured to track only mutable attributes.

7. The system as recited in claim 5, wherein, to track accesses of the attributes of the client state, the first application server is further configured to track only mutable accesses of the attributes of the client state, wherein mutable accesses comprise write accesses of any of the attributes of the client state.

8. The system as recited in claim 5, wherein, to compare the tracked accessed attributes to a benchmark of the attributes of the client state, the system is further configured to perform binary differencing of a binary representation of the tracked accessed attributes and a binary representation of the benchmark of the attributes of the client state to locate the modified tracked accessed attributes.

9. The system as recited in claim 5, wherein, to compare the tracked accessed attributes to a benchmark of the attributes of the client state, the system is further configured to perform object graph differencing of an object graph representation of the tracked accessed attributes and an object graph representation of the benchmark of the attributes of the client state to locate the modified tracked accessed attributes.

10. A system, comprising:
a distributed store comprising a primary state of session data configured for access by a plurality of application servers, wherein the primary state of the session data comprises a plurality of attributes;
a first one of the application servers comprising a client state of the session data, wherein the application server is configured to provide access to the client state of the session data to processes executing within the application server;
wherein the system is configured to:
determine a subset of the attributes of the primary state of the session data that have been modified in the client state;
synchronize the primary state with the client state according the subset of the attributes that have been modified.

11. The system as recited in claim 10, wherein the application server is configured to provide access to the session data for one or more client sessions of the system.

12. The system as recited in claim 10, wherein, in said determining the subset of the attributes of the session data, the system is further configured to perform binary differencing of a binary representation of the client state and a binary representation of a benchmark of the client state to locate the modified attributes.

13. The system as recited in claim 10, wherein, in said determining the subset of the attributes of the session data, the system is further configured to perform object graph differencing of an object graph representation of the client state and an object graph representation of a benchmark of the client state.

14. The system as recited in claim 10, wherein the first application server is configured to track accesses of the attributes of the client state, wherein the system is configured to:

determine a subset of the tracked accessed attributes that have been modified in the client state; and synchronize the primary state with the client state according to the subset of the tracked accessed attributes.

15. The system as recited in claim 14, wherein, to track accesses of the attributes of the client state, the first application server is further configured to track only mutable attributes.

16. The system as recited in claim 14, wherein, to track accesses of the attributes of the client state, the first application server is further configured to track only mutable accesses of the attributes of the client state, wherein mutable accesses comprise write accesses of any of the attributes of the client state.

17. The system as recited in claim 14, wherein, in said determining the subset of the tracked accessed attributes, the system is further configured to perform binary differencing of a binary representation of the tracked accessed attributes and a binary representation of a benchmark of the attributes of the client state to locate the modified tracked accessed attributes.

18. The system as recited in claim 14, wherein, in said determining the subset of the tracked accessed attributes, the system is further configured to perform object graph differencing of an object graph representation of the tracked accessed attributes and an object graph representation of a benchmark of the attributes of the client state to locate the modified tracked accessed attributes.

19. A system, comprising:
a distributed store comprising a primary state of session data configured for access by a plurality of application servers, wherein the primary state of the session data comprises a plurality of attributes;
a first one of the application servers comprising a client state of the session data, wherein the first application sewer is configured to provide access to the client state of the session data to processes executing within the application server;
means for determining a subset of the attributes of primary state of the session data that have been modified in the client state; and
means for synchronize the primary state with the client state according to the subset of the attributes.

20. The system as recited in claim 19, wherein said means for determining the subset of the attributes of the session data comprises means for performing a binary differencing of a binary representation of the client state and a binary representation of a benchmark of the client state to locate the modified attributes.

21. The system as recited in claim 19, wherein said means for determining the subset of the attributes of the session data comprises means for performing an object graph differencing of an object graph representation of the client state and an object graph representation of a benchmark of the client state to locate the modified attributes.

22. The system as recited in claim 19, further comprising:
means for tracking accesses of the attributes of the client state;
means for determining a subset of the tracked accessed attributes that have been modified in the client state; and
means for synchronizing the primary state with the client state according to the subset of the tracked accessed attributes.

23. The system as recited in claim 22, wherein means for tracking accesses of the attributes of the client state comprises means for tracking only mutable attributes.

24. The system as recited in claim 22, wherein means for tracking accesses of the attributes of the client state comprises means for tracking only mutable accesses of the attributes of the client state, wherein mutable accesses comprise write accesses of any of the attributes of the client state.

25. The system as recited in claim 22, wherein means for determining the subset of the tracked accessed attributes comprises means for performing binary differencing of a binary representation of the tracked accessed attributes and a binary representation of a benchmark of the attributes of the client state to locate the modified tracked accessed attributes.

26. The system as recited in claim 22, wherein means for determining the subset of the tracked accessed attributes comprises means for performing object graph differencing of an object graph representation of the tracked accessed attributes and an object graph representation of a benchmark of the attributes of the client state to locate the modified tracked accessed attributes.

27. A method comprising:
determining a subset of attributes in a client state of session data on a first application server that have been modified, wherein the session data is accessible to one or more processes executing within the application server; and
synchronizing a primary state of session data on a distributed store with the client state according to the subset of the attributes, wherein the primary state is accessible by a plurality of application servers including the first application server.

28. The method as recited in claim 27, wherein said determining the subset of the attributes of the session data comprises performing a binary differencing of a binary representation of the client state and a binary representation of a benchmark of the client state to locate the modified attributes.

29. The system as recited in claim 27, wherein said determining the subset of the attributes of the session data comprises performing an object graph differencing of an object graph representation of the client state and an object graph representation of a benchmark of the client state.

30. The method as recited in claim 27, further comprising:
the first application server tracking accesses of the attributes of the client state;
determining a subset of the tracked accessed attributes that have been modified in the client state; and
synchronizing the primary state with the client state according to the subset of the tracked accessed attributes.

31. The method as recited in claim 30, wherein tracking accesses of the attributes of the client state comprises tracking only mutable attributes.

32. The method as recited in claim 30, wherein tracking accesses of the attributes of the client state comprises tracking only mutable accesses of the attributes of the client state, wherein mutable accesses comprise write accesses of any of the attributes of the client state.

33. The method as recited in claim 30, wherein said determining the subset of the tracked accessed attributes comprises performing binary differencing of a binary representation of the tracked accessed attributes and a binary representation of a benchmark of the attributes of the client state to locate the modified tracked accessed attributes.

34. The system as recited in claim 30, wherein said determining the subset of the tracked accessed attributes comprises performing an object graph differencing of an object graph representation of the tracked accessed attributes and an object graph representation of a benchmark of the attributes of the client state to locate the modified tracked accessed attributes.

35. A tangible, computer accessible storage medium comprising software instructions computer-executable to implement:

determining a subset of attributes in a client state of session data on an first application server that have been modified, wherein the session data is accessible to one or more processes executing within the first application server; and synchronizing a primary state of session data on a distributed store with the client state according to the subset of the attributes, wherein the primary state is accessible by a plurality of application servers including the first application server.

36. The tangible, computer accessible storage medium as recited in claim 35, wherein said determining the subset of the attributes of the session data comprises performing a binary differencing of a binary representation of the client state and a binary representation of a benchmark of the client state to locate the modified attributes.

37. The tangible, computer accessible storage medium as recited in claim 35, wherein said determining the subset of the attributes of the session data comprises performing an object graph differencing of an object graph representation of the client state and an object graph representation of a benchmark of the client state.

38. The tangible, computer accessible storage medium as recited in claim 35, wherein the software instructions are further executable to:

the first application server tracking accesses of the attributes of the client state;

determining a subset of the tracked accessed attributes that have been modified in the client state; and synchronizing the primary state with the client state according to the subset of the tracked accessed attributes.

39. The tangible, computer accessible storage medium as recited in claim 38, wherein tracking accesses of the attributes of the client state comprises tracking only mutable attributes.

40. The tangible, computer accessible storage medium as recited in claim 38, wherein tracking accesses of the attributes of the client state comprises tracking only mutable accesses of the attributes of the client state, wherein mutable accesses comprise write accesses of any of the attributes of the client state.

41. The tangible, computer accessible storage medium as recited in claim 38, wherein said determining the subset of the tracked accessed attributes comprises performing binary differencing of a binary representation of the tracked accessed attributes and a binary representation of a benchmark of the attributes of the client state to locate the modified tracked accessed attributes.

42. The tangible, computer accessible storage medium as recited in claim 38, wherein said determining the subset of the tracked accessed attributes comprises performing an object graph differencing of an object graph representation of the tracked accessed attributes and an object graph representation of a benchmark of the attributes of the client state to locate the modified tracked accessed attributes.

* * * * *

UNITED STATES PATENT AND TRADEMARK OFFICE
CERTIFICATE OF CORRECTION

PATENT NO. : 7,320,035 B2
APPLICATION NO. : 10/087225
DATED : January 15, 2008
INVENTOR(S) : Ajay Kumar, Hanumantha Rao Susarla and Prakash Khemani It is certified that error appears in the above-identified patent and that said Letters Patent is hereby corrected as shown below:

In the Claims:

Column 17, line 36, please delete "sewer" and insert --server-- in place thereof.

Signed and Sealed this

Third Day of June, 2008

JON W. DUDAS
*Director of the United States Patent and Trademark Office*